United States Patent Office 3,502,131
Patented Mar. 24, 1970

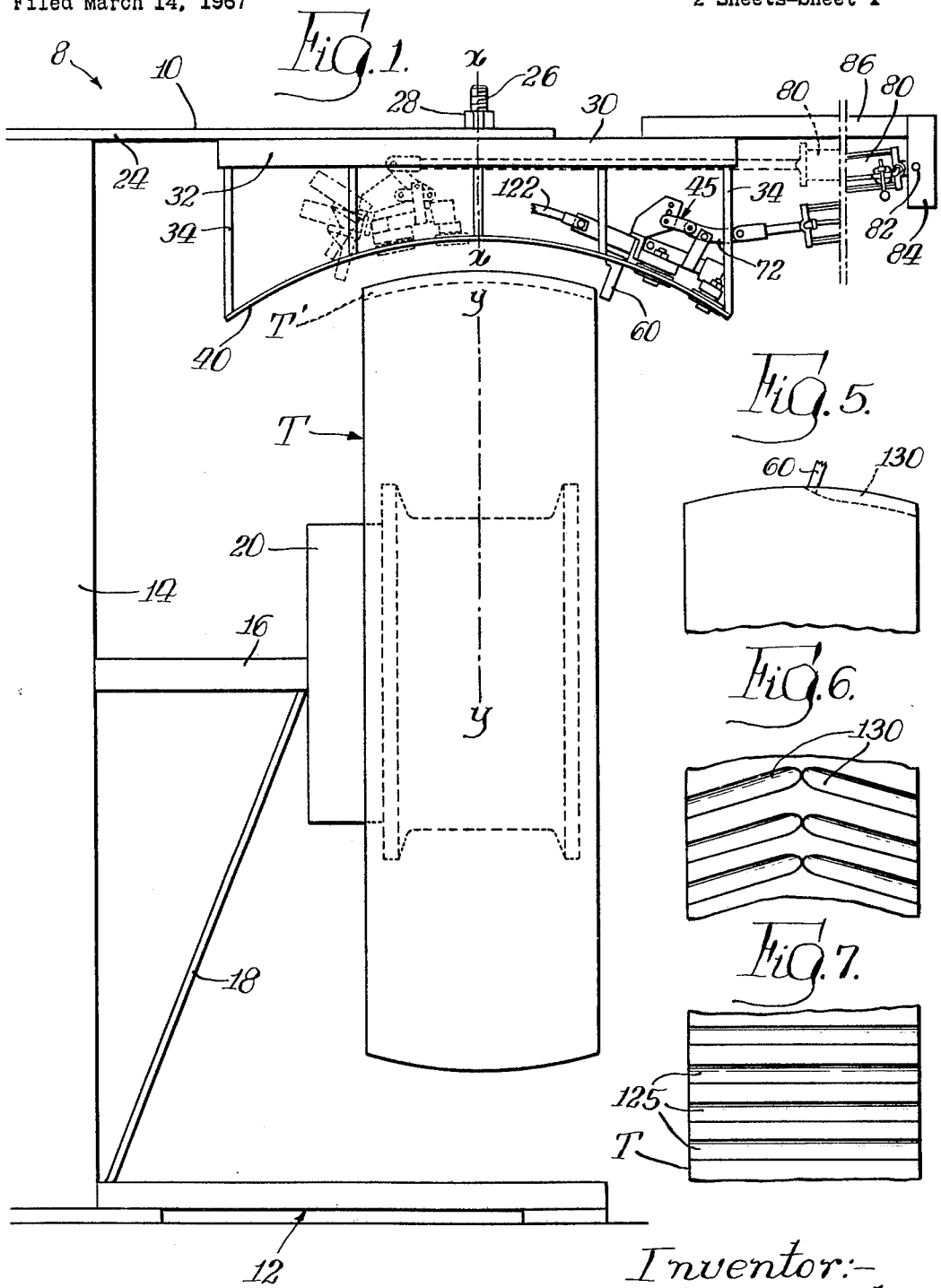

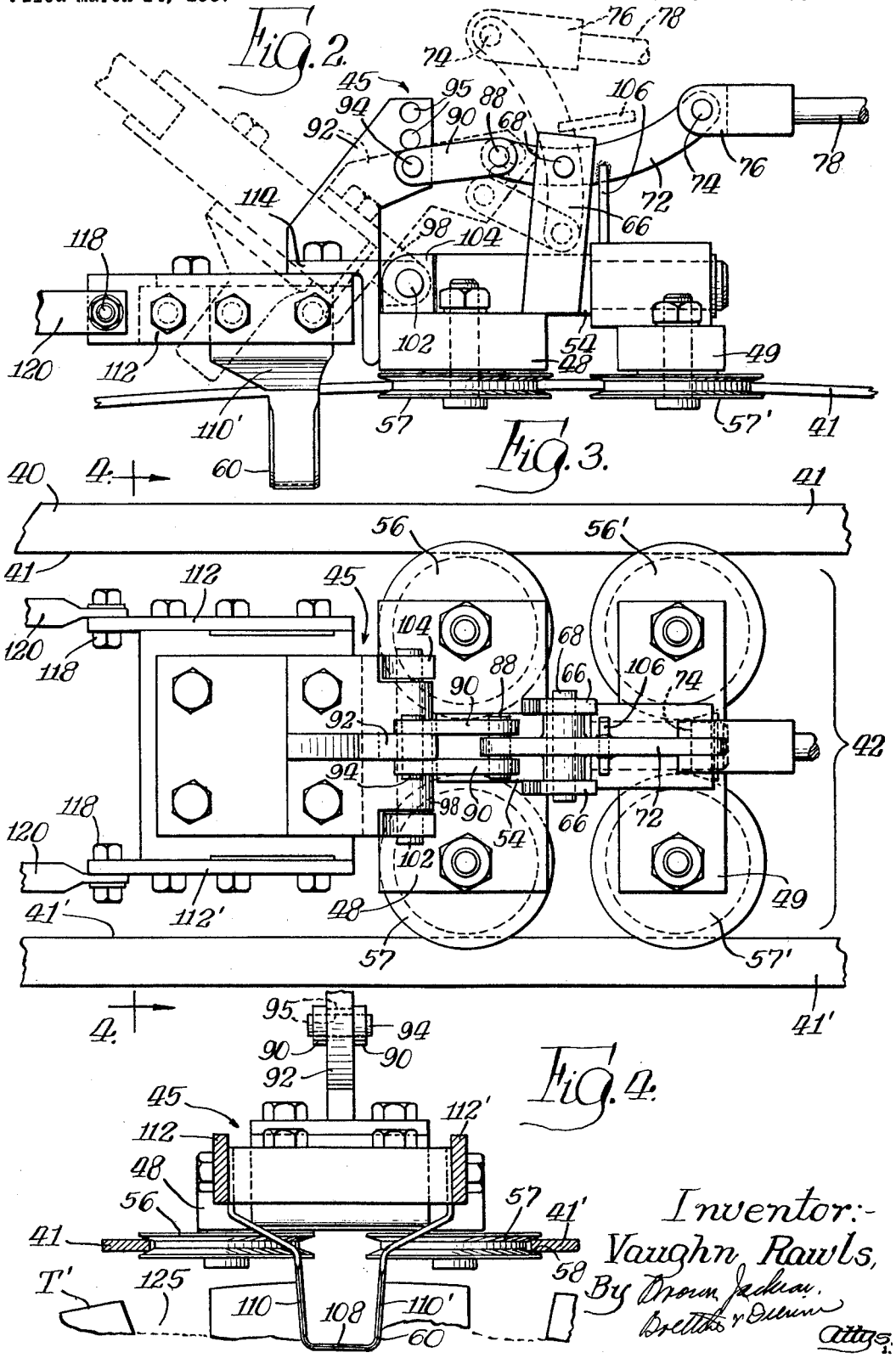

3,502,131
APPARATUS FOR CUTTING TREAD PATTERNS IN BUILT-UP TIRES
Vaughn Rawls, Lima, Ohio, assignor, by mesne assignments, to National-Standard Company, Niles, Mich., a corporation of Delaware
Filed Mar. 14, 1967, Ser. No. 623,072
Int. Cl. B29h *17/36;* B60c *11/00*
U.S. Cl. 157—13                  4 Claims

ABSTRACT OF THE DISCLOSURE

A tread portion of uncured rubber is applied over a tire carcass, whereupon a tread design is cut in this uncured tread portion by apparatus comprising an electrically heated knife mounted on a carriage which is reciprocated to and fro in a curved track extending approximately concentrically transversely across the uncured tread portion. The driving linkage for the carriage and knife is such that it is only when a pulling force is applied that the knife is forced down into cutting position. This enables one to start a cut in the middle of the tread, as for the making of chevron treads. The apparatus also has a swiveled mounting for making diagonal cuts in the tread. After the making of the tread design the tire is cured.

---

After the body of uncured tread material has been secured around the carcass unit, such unit is then subjected to the action of a heated knife mounted on a carriage which travels to and fro in a curved track structure extending transversely and substantially concentrically of the tire carcass. The carriage and heated knife are preferably reciprocated by a fluid pressure ram.

One of the objects of the invention is to provide an improved driving linkage for the carriage and knife such that it is only when a pulling force is applied to the knife that it is forced down into cutting position for grooving the uncured tread portion. This feature enables one to start a cut in the middle of the tread portion, as for the making of a chevron pattern of tread in the uncured tread portion.

Another object of the invention is to mount the curved track, carriage and hydraulic ram for swiveling motion about an axis extending substantially radially of the tire carcass and tread portion. This permits the curved track to be swiveled through approximately 180 degrees so as to permit the heated knife to be moved across the uncured tread portion at substantially any desired angle.

As still another feature, the radius of the curved track with respect to the radius of the built up tire determines the desired tread depth. By changing either or both of these radii, the tread design depth can be varied infinitely across the tread width of the built-up tire. The hot knife is preferably heated electrically by an electric current.

Heretofore, it has been a common practice to retread a worn carcass by applying a tread layer of uncured rubber over the carcass and then forming the desired tread design by placing the unit in a heated mold which has the desired tread pattern formed therein. This has necessitated the stocking of a large number of molds for tires of different sizes and for producing tread patterns of different designs. All of this is avoided by employing the present apparatus and procedure, which can be readily changed for accommodating different sizes and patterns of tires. It will be understood that after the desired pattern has been formed around the entire retread body, the tire will then be subjected to a complete curing operation.

Other objects, features and advantages of the invention will appear from the following detailed description of one preferred embodiment thereof. In the accompanying drawings illustrating such embodiment:

FIGURE 1 is a side elevational view, partially diagrammatic, of the improved apparatus.

FIGURE 2 is a fragmentary side elevational view of the reciprocable carriage which carries the tread cutting heated knife along the curved track, this view being on a larger scale.

FIGURE 3 is a fragmentary plan view of the carriage, as shown in FIGURE 2, and

FIGURE 4 is a transverse sectional view taken approximately on the plane of line 4—4 of FIGURE 3.

FIGURE 5 is a fragmentary view showing the heated knife in the operation of cutting from the middle of the tread outwardly, as in the formation of a chevron tread.

FIGURE 6 is an elevational view of such a chevron tread, and

FIGURE 7 is an elevational view of a conventional tread cut by the heated knife.

Referring first to FIGURE 1, the apparatus generally designated 8 comprises a main frame 10 having a horizontal base structure 12 from one end of which rises uprights or a main supporting structure 14. Projecting horizontally substantially from a mid point of an upright structure 14 is an axle assembly 16 which is reinforced by diagonal brace means 18. The outer end of this axle structure 16 carries a center drum 20 upon which is adapted to be rotatably mounted the tire T which is adapted to have the tread cut in the retreaded uncured portion of the tire. This retreaded, uncured portion is diagrammatically indicated at T', but it will be understood that it may be of any desired thickness or width.

Extending horizontally from the upper portion of the vertical upright 14, over the center drum 20 is a rigid support bar 24. Extending downwardly through the outer portion of this support bar 24 is a threaded swivel bolt 26 provided with a locking nut 28. Mounted for swiveling rotation by the swivel bolt 26 on the underside of the support bar 24 is a track supporting structure 30. The support frame 30 is centrally mounted for horizontal rotation on the swivel bolt 26 so that the vertical swivel axis *x—x* passing down through the bolt also passes substantially centrally of the track support frame 30. This vertical swivel axis *x—x* is also coincident with the vertical median axis *y—y* passing down centrally through the width of the tire carcass T.

The track support frame 30 comprises a pair of spaced parallel beams 32. Secured to these beams and extending downwardly therefrom are spaced pairs of hanger rods 34 which rigidly suspend at their lower ends a curved track 40 extending substantially concentrically over the top of the tire carass T. This curved track comprises two relatively thin curved guide bars 41, 41' set in spaced edge to edge parallel relationship with a trackway 42 defined therebetween. The carriage 45 comprises a substantially rectangular body portion 54 having front and rear cross bars 48 and 49 secured thereto. A pair of peripherally grooved guide wheels 56, 56' are journaled in these cross bars for guidance along the track rail 41, and another pair of such grooved guide wheels 57, 57' at the other ends of these cross bars for guidance along the other track rail 41'. The peripheral grooves 58 in these guide wheels have sufficient depth to embrace a substantial portion of each trackway bar, but the grooves have enough diverging slope to permit them to follow the arcuate curvature of the tracks without binding. This traveling carriage mounts the electrically heated cutting knife 60, which will be later described. This carriage 45 comprises a lengthwise frame structure 54 having a pair of upwardly extending spaced pivot bars 66 extending rigidly upwardly therefrom. A pivot pin 68 extends transversely through the upper portions of the spaced pivot bars 66, and extending between these spaced pivot bars is a transverse pivot pin 68. Extending between these bars 66 for pivotal mounting on the pin 68, is a curved rocker bar or lever 72. The outer end of this rocker bar 72 is pivoted at 74 to a clevis 76 which is secured to the piston rod 78 of a fluid pressure cylinder 80. This cylinder preferably utilizes compressed air, although it might utilize a hydraulic ram liquid. The other end of the power cylinder 80 is pivoted at 82 to a fixed bracket 84 extending downwardly from a radial supporting beam 86, which has its inner end fixedly secured to the track support frame 30 to swivel therewith around the swiveling axis x—x.

Referring back to the curved lever 72 which is operated by the power cylinder 80, the inner end of this lever carries a transverse pivot pin 88 which passes through a pair of relatively short coupling or connecting links 90 embracing this end of the curved link 72. The other ends of these short coupling links 90 embrace the back edge of a knife actuating rocker 92, to which they are pivoted by a coupling pin 94. The coupling pin 94 can be removed from any one of a series of vertically spaced pivot holes 95 provided along the back edge portion of the knife actuating rocker 92, and then inserted in another of these vertically spaced pivot holes 95 therein as for adjusting the depth of cut of the heated cutting knife 60. The knife actuating rocker 92 has rocker mounting about a downwardly extending pivot lug 98 which is pivoted by pivot pin 102 to a stationary pivot lug 104 extending upwardly from the body of the carriage 45. A stop 106 secured to link 72 is adapted to engage the carriage and limit the clcokwise movement of link 72.

The electrically heated knife 60 is of stirrup-shape configuration having a transversely extending bottom bar portion 108 provided with upwardly extending side portions 110, 110' of highly conductive metal. The bottom bar portion 108 and the upwardly extending side portions 110 are preferably formed with sharpened knife-like forward or right hand edges. The upwardly extending side portions 110 have widened upper portions which have attachment by bolts, rivets or the like to mounting arms 112 which project rearwardly from an angle bar mounting element 114. These two side portions 110 or their mounting arms 112 are electrically insulated from each other.

Bolted at 118 to the rear ends of the mounting arms 116 and to the widened portions 110 are connector lugs 120 which are electrically connected to heavy insulated electrical cable 122 supplying high amperage heating current to the electrically heated knife 60. It will be seen from the foregoing that this knife can swing upwardly to a clearing position about the pivot pins 102.

Referring now to the operation of the apparatus, it will be assumed that the carriage 45 is adjacent to the left hand end of the track 40, with the electrically heated knife 60 disposed at the left hand side of the tire. The hydraulic ram 80 starts pulling the carriage 45 through the piston rod 78, which operates through pivots 74 and 68 to swing the curved link 72 in a clockwise direction toward the position illustrated in full lines at the right hand side of FIGURE 1. The initial clockwise movement of the curved link 72 operates through the right hand pivot 88 of the pair of short coupling links 90 to swing such coupling links around the pivot 94. This swings the knife actuating rocker 92 in a counterclockwise direction around the pivot pin 102 to carry the heated knife 60 downwardly into its lower position for cutting through the uncured tread portion T'. The above knife actuating motion is also augmented by the travel of the carriage 45 through the arcuate path defined by the curved track 42. As the power cylinder 80 completes its pulling motion toward the right, the heated knife 60 cuts a transverse tread defining groove 125 across the entire width of the uncured layer of rubber T' (FIGURE 7). Upon the completion of this cutting operation toward the right, the fluid pressure in the power cylinder 80 is reversed, and starts pushing the carriage 45 toward the left. This immediately swings the curved link 72 in a counterclockwise direction about the mounting pivot 68. The retractive motion transmitted through the coupling links 90 swings the knife actuating rocker 92 in a clockwise direction to swing the knife 60 up into a position where it clears the uncured tread portion T', so that no tread grooving operation occurs on this reverse or restoring motion of the carriage. Upon the completion of the restoring motion of the carriage, the tire T is revolved either manually or automatically through such angular distance as may be desired between the transverse grooves 125 in the tread. Upon the completion of the tire revolving movement, the foregoing grooving operation is then repeated, and this is continued around the entire circumference of the tire, whereupon the tire is removed from the center drum 20 and is subjected to a final curing operation.

If it is desired to have relatively wide grooves 125 in the tread, the tire can be revolved a relatively short angular distance between successive pairs of cutting operations so that each pair of cutting operations merely forms a wider groove.

If it is desired to cut grooves diagonally crosswise of the tread, the entire assembly of the curved track 40, carriage 45 and heated cutting knife 60 can be rotated around the vertical axis x—x to place the curved track 40 at the desired angle of the grooves.

If it is desired to form a tread surface having a chevron pattern of grooves 130 both sloping outwardly and downwardly from the center of the tire (FIGURE 6), each groove is started at the central or median plane of the tread with a minimum depth of groove, and is then increased in depth outwardly towards the sides of the tire. This procedure of cutting a chevron patern is facilitated by the ability to have the heated knife start each cutting operation in the middle of the tire, and then having its depth of cut increased towards each side of the tire (FIGURE 5).

If it is desired that the tread grooves be adjusted to a deeper or shallower depth, this can be readily effected by raising or lowering the curved track 40; or by raising or lowering the height of the tire supporting drum 20. The back and forth oscillation of the knife supporting carriage 45 and the advancing movement of the tire T, may be effected automatically if desired.

The waste rubber stock cut out of the uncured tread can be fed back into the feed hopper of the extruding machine for reuse on other tire carcasses.

While I have described the invention in a preferred form, I do not intend to be limited to that form, except insofar as the appended claims are so limited, since various modifications within the scope of the present invention will readily occur to those skilled in the art, particularly with my disclosure before them.

I claim:

1. In an apparatus for forming a tread pattern in a tire carcass having an uncured tread portion, the combination of means for rotatably supporting said tire carcass, guide track means extending substantially transversely of said tread portion, a carriage movable along said guide track means, power means provided for reciprocating said carriage along said track means, a heated element for cutting grooves in said uncured tread portion, rocker means for rockably mounting said heated element on said carriage, and means operatively connecting said rocker means with said power means whereby the operation of said power means in one direction rocks said heated element into cutting engagement with said tread portion and the operation of said power means in the other direction rocks said heated element out of engagement with said tread portion.

2. In an apparatus for forming a tread patern in a tire carcass having an uncured tread portion, the combination of means for rotatably supporting said tire carcass, guide track means extending substantially transversely of said track portion, a heated element movable along said guide track means for cutting grooves in said uncured tread portion, a carriage movable along said trackway, a rocker rockably mounted on said carriage, an electrically heated U-shaped cutting element carried by said rocker for rocking movement into and out of cutting engagement with said tread portion, a power unit comprising a cylinder member and a piston rod member, a tiltable lever pivotally mounted on said carriage, means operatively connecting one of said power members with one end of said lever, and link means connecting the other end of said tiltable lever with said rocker whereby operation of said power unit causes transverse movement of said carriage along said trackway and also causes rocking of said heated cutting element into and out of engagement with said tread portion for cutting tread grooves therein.

3. The method of retreading tires comprising forming an uncured tread portion on the periphery of a tire carcass, automatically positioning a heated cutter at a selected position along the width of the uncured tread portion, forming grooves in said tread portion by said heated cutter engaging therein, and curing the tread portion.

4. The method of retreading tires as defined in claim 3, wherein the step of forming grooves in said tread portion includes moving the heated cutter at a desired angle through said tread portion.

References Cited

UNITED STATES PATENTS

| | | | |
|---|---|---|---|
| 2,159,786 | 5/1939 | Errig et al. | 157—13 |
| 2,192,130 | 2/1940 | Errig et al. | 157—13 |
| 2,405,802 | 8/1946 | Taber | 264—36 |
| 2,578,997 | 12/1951 | Errig et al. | 157—13 |
| 2,995,183 | 8/1961 | Love | 157—13 |

TRAVIS S. McGEHEE, Primary Examiner

E. F. DESMOND, Assistant Examiner